Aug. 27, 1940.    W. BRUNNHOELZL    2,212,507
DEVICE FOR CONVEYING AND COUNTING PACKAGES
Filed July 2, 1938    3 Sheets-Sheet 1
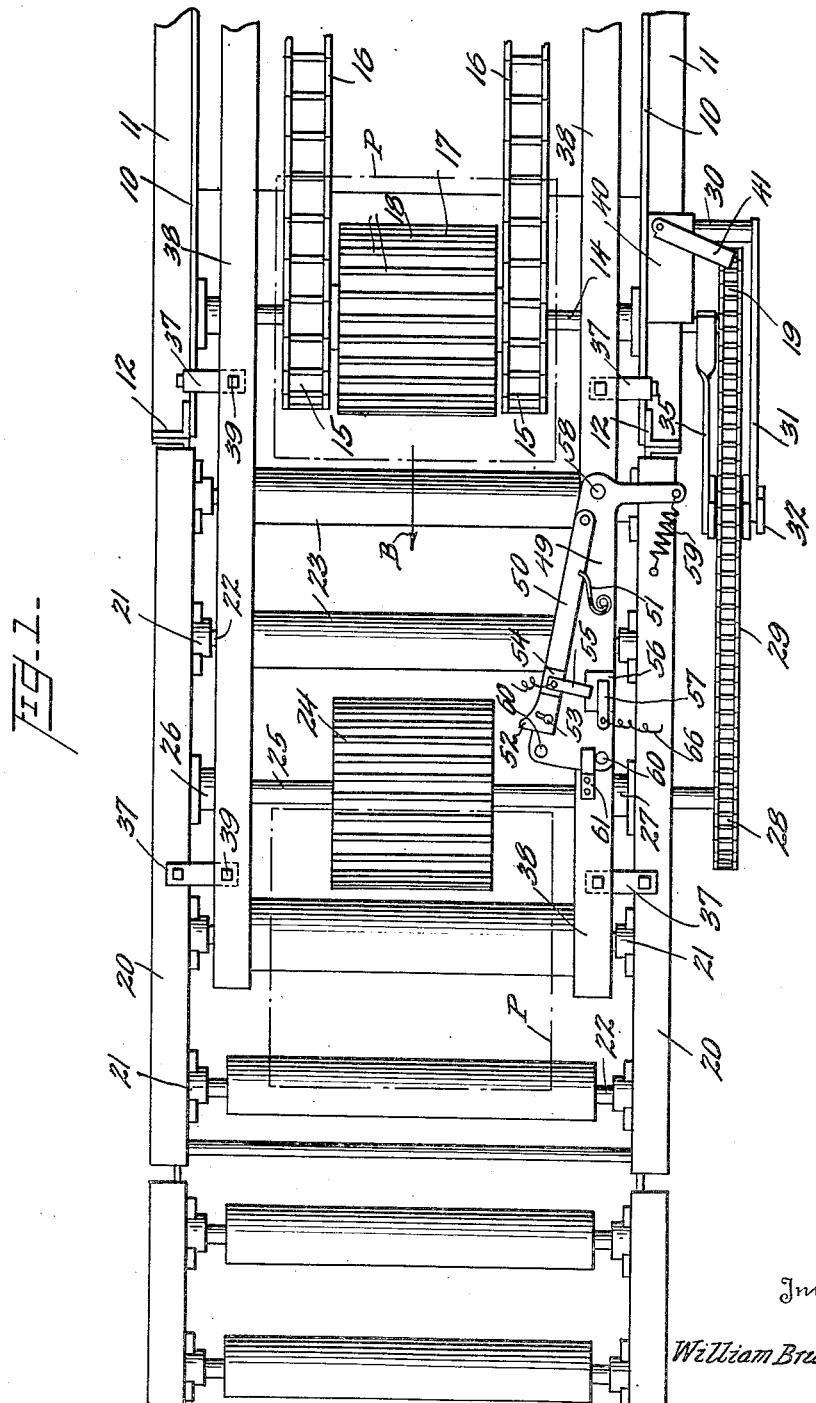
Inventor
William Brunnhoelzl,
By Ivan P. Tashof
Attorney

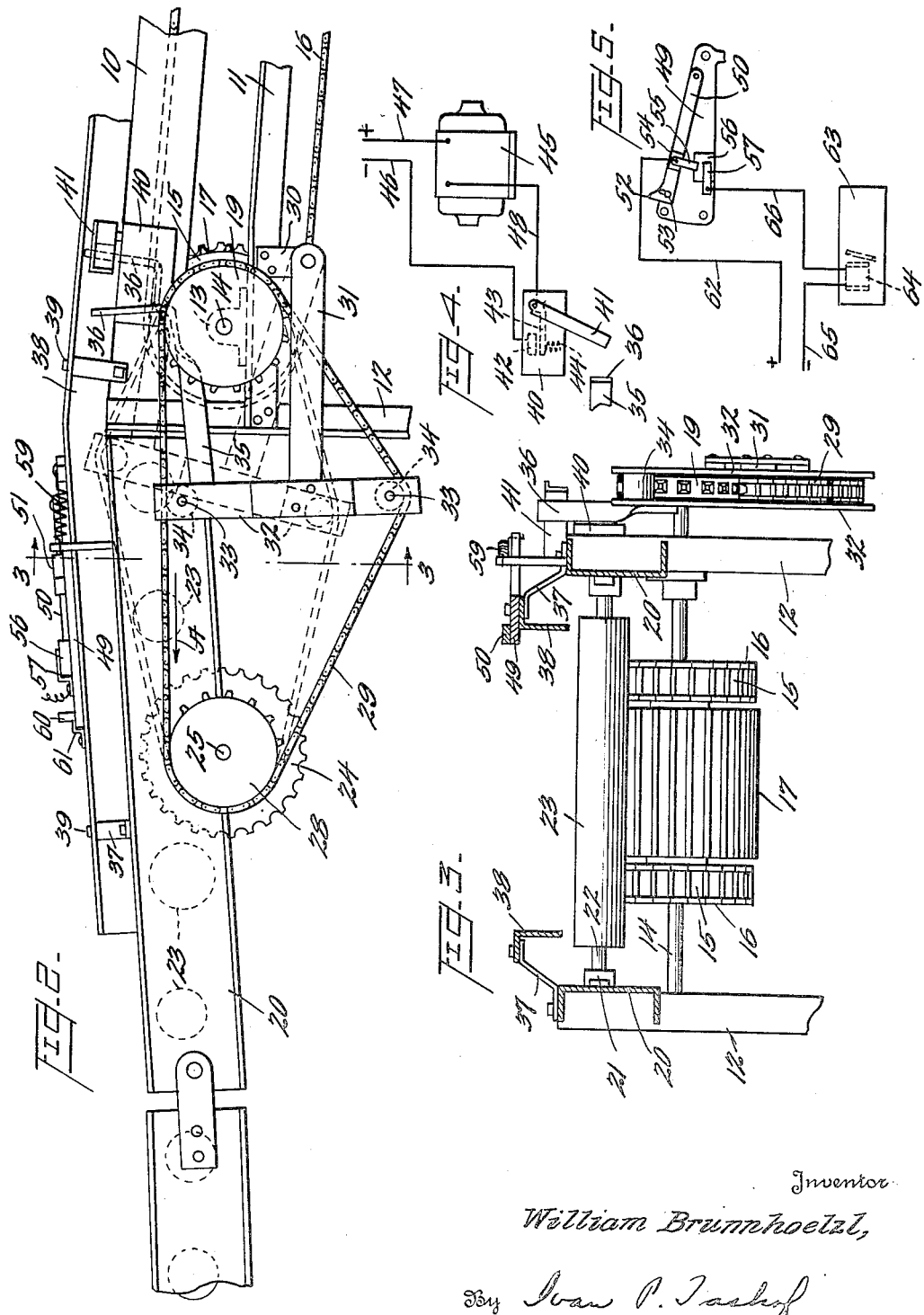

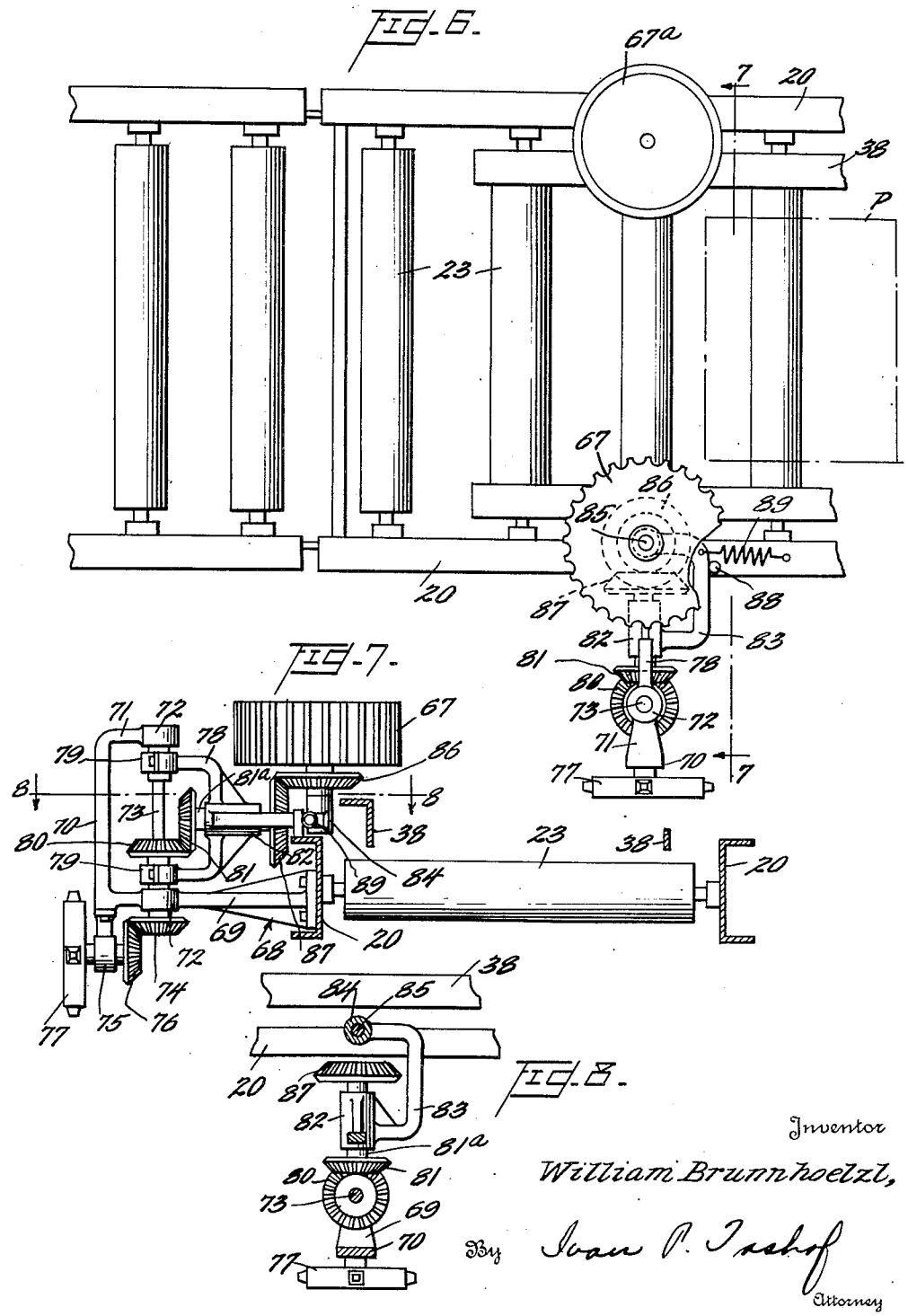

Patented Aug. 27, 1940

2,212,507

UNITED STATES PATENT OFFICE 2,212,507

DEVICE FOR CONVEYING AND COUNTING PACKAGES

William Brunnhoelzl, Brooklyn, N. Y., assignor to J. Julian Tashof, New York, N. Y., as trustee Application July 2, 1938, Serial No. 217,270

13 Claims (Cl. 235—98)

The present invention relates to the counting of package goods and particularly to the automatic counting of packages passing along a conveyor.

More especially the invention relates to means for preventing a miscount of automatic package counters.

In certain package conveyors it is customary to provide a package counter which is actuated each time a package passes by the outward movement of a lever arm engaged by the moving package, the arm being reset to lie in the path of the next package as soon as the first package has passed. However, if two packages are in engagement the arm will not swing to reset position, being held from such movement by its engagement with the rearwardly positioned package. A miscount will thus result, the two packages being counted as but one.

One object of the present invention is to provide novel counting mechanism in connection with a conveyor means, the conveyor means being so arranged as to automatically separate successive packages as they pass the counting station.

It may happen that the conveyor may be so filled with packages accidentally that the separating mechanism fails to properly operate to space successive packages or it may happen that when such a conveyor is used in loading packages to be paid for by count, a dishonest person may retard a package to prevent its separation from the next succeeding package whereby to effect a miscount and cause the delivery of two packages while the counter indicates only the delivery of one package.

The counting mechanism according to the present invention is particularly suited to the counting of beer cases just prior to loading the same into a vehicle for delivery.

A second important object of the invention is to stop the conveyor mechanism if it happens that any prevention of proper operation of the separating mechanism and hence of the counter occurs whether said defect in the action of the separating mechanism occurs by jamming up of packages on the conveyor or by wilful tampering with such separating mechanism to prevent true counting of packages passing on the conveyor. Thus an indication is at once given that the counter is not in proper operative action.

With the above and other important objects in view, as will be presently apparent, the invention consists in general of certain novel details of construction and combinations of parts hereinafter fully described, illustrated in the accompanying drawings and particularly pointed out in the appended claims.

In the accompanying drawings like characters of reference indicate like parts in the several views, and:

Figure 1 is a plan view of adjacent ends of a pair of conveyor sections and a counter as constructed in accordance with this invention.

Figure 2 is a side elevation of the mechanisms shown in Figure 1.

Figure 3 is a detail section on the line 3—3 of Figure 2.

Figure 4 is a wiring diagram showing the switch controlling the motor.

Figure 5 is a wiring diagram showing an electric counter arrangement as used herein.

Figure 6 is a plan view showing a modification of certain parts of the invention.

Figure 7 is a detail section on the line 7—7 of Figure 6.

Figure 8 is a fragmentary section on the line 8—8 of Figure 7.

As shown in Figs. 1 to 5 the invention includes a pair of main side frame upper members 10 and a pair of main side frame lower members 11 which are tied together at their forward or delivery ends by vertical members 12. The lower members 11 support alined bearings 13 of which only one is shown. Journalled in these bearings 13 is a shaft 14 whereon is fixed a pair of spaced sprockets 15 around which are trained the chains 16 of a chain conveyor, only the delivery end of this conveyor being shown. A drum 17 is fixed on the shaft 14 and this drum is provided with longitudinal ribs or teeth 18, the diameter of the drum over the teeth being slightly greater than the diameter of the chains 16 as they pass around the sprockets 15. This drum will hereafter be called, for convenience, the delivery drum. The shaft 14 extends laterally from the side of the conveyor frame and on this projecting end is fixed a sprocket wheel 19.

A pair of channels 20 extend forwardly from the members 12 and form the side portions of an extension conveyor. The channels 20 have opposed bearings 21 and in these bearings are held the journals 22 of freely revolving conveyor rolls 23. The channels 20 are inclined downwardly from the ends adjacent the main conveyor so that these channels and the rolls 23 form a gravity conveyor along which packages, such as indicated at P, will freely pass under the influence of gravity. Between one pair of adjacent idler rolls 23 is arranged a drum 24 similar to the drum 17. A shaft 25 has the drum 24 fixedly mounted thereon. One end the shaft 24 is journalled in a bearing 26 fixed to one of the channels 20 and the other channel 20 carries a bearing 27 through which the shaft 25 passes to project outwardly of the side of the extension or auxiliary conveyor. This projecting portion of the shaft 25 has a sprocket wheel 28 fixed thereon. The sprocket 28 is in edge alinement with the sprocket 19 and a sprocket chain 29 is loosely trained around the wheels 19 and 28.

A bracket 30 is fixed to one of the frame members 11 on the same side of the main conveyor as the sprocket 19 and an arm 31 is pivoted at one of its ends to the lower end of the bracket 30. This arm 31 extends forwardly from the bracket 30 and on its free forward end is fixed an upright cross-piece 32. The cross-piece 32 has stub shafts 33 projecting inwardly from its upper and lower end portions and on these stub shafts are mounted freely revoluble idlers 34, the upper run of the chain 29 passing over the upper idler 34 and the lower run of the chain 29 passing under the lower idler. The spacing of these idlers and the arrangement of the arm 31 and cross-piece 32 are such that the chain is kept taut and the upper run of the chain is straight. Thus the shaft 25 and drum 24 are driven from the shaft 14 and the proportions of the parts are such that the peripheral speed of the drum 24 is greater than the peripheral speed of the drum 17 under normal running conditions. The chain travels in the direction of the arrow A in Figure 2, the general travel of material on the conveyor being shown by the arrow B in Figure 1. By the peculiar speed relation of the drums 24 and 17 the packaged goods receive an accretion of speed as they pass over the drum 24 so that any two packages in contact as they pass over the drum 17 will be separated as soon as the foremost box is engaged by the drum 24 since such foremost box will, for a time, travel faster than the rearmost box of the two.

Fixed to the upper part of the cross-piece 32 is a bracket or striker arm 35 having an upturned striker nose 36. On the frame members 10 and 20 are fixed upwardly and inwardly extending brackets 37 bolted to guide angles 38 by bolts 39 for preventing the packages from leaving the conveyor laterally. Fixed on the conveyor frame is a normally closed switch 40 having an operating arm 41 positioned for engagement by the nose 36, upon the arm 31 swinging upwardly on its pivot. The switch 40 includes a fixed contact 42 and a movable contact 43 connected to the arm 41 to swing therewith and held closed on the contact 42 by a spring 44. At 45 is indicated the main driving motor for the conveyor. It is obvious that the driving motor 45 may be connected in any suitable manner for driving the conveyor chains 16. For example, it may be directly connected to drive the shaft 14 as by a sprocket wheel, a train of gearing or in any other suitable manner. Power supply conductors 46 and 47 are connected to the contact 42 and one terminal of the motor 45 respectively and a conductor 48 connects the other terminal of the motor with the movable contact 43. Thus normally, when current is supplied the conductors 46 and 47, the motor will be in circuit and operate.

Under these conditions if the passage of a package over the drum 24 be retarded, as by clogging of the auxiliary conveyor or human intervention, the tension on the lower run of the chain 29 will be increased and the tension on the upper run of said chain will be lessened since the motor driven sprocket 19 will continue to run at uniform speed. This will have the effect of raising the cross-piece 32 and arm 31 which will cause the nose 36 to engage the arm 41 and open the switch 40 thus stopping operation of the motor 45. This condition will prevail until the auxiliary conveyor is cleared whereupon the cross-piece 32 will drop by gravity releasing the nose 36 from engagement with the arm 41 controlling the switch 40 which will then be closed by the action of the spring 44.

Mounted on one of the guides or guards 38 is a bracket 49 whereto is pivoted one end of a counter arm 50 biased inwardly by a spring 51. This arm carries an adjustable nose 52 at its free end, the nose being connected to the bracket 49 by a bolt and slot connection 53. On this arm 50 is an insulating block 54 which carries a contact finger 55 moving with the arm. Fixed on the bracket 49 is an insulating block 56 whereon is mounted a fixed contact finger 57 mounted in the path of the finger 55. The bracket 49 is swingingly mounted on a pivot 58 and is biased inwardly by a spring 59. On the free end of the bracket 49 is fixed a pair of stop lugs 60 spaced to lie on opposite sides of a fixed stop 61 so that the swinging movement of the bracket 49 is thereby limited. The nose 52 normally lies in the path of the packages moving along the conveyor and is so located that it engages each package just prior to the engagement of such package by the drum 24. As such engagement takes place the arm 50 swings outwardly and the contact 55 closes on the contact 57. After such contact the bracket 49 may also swing outwardly if such movement is necessitated by the size of the package. As previously described, each package will move rapidly away from the succeeding package as the first package passes over the drum 24 so that a space will normally be left between packages for the inward swinging of the arm 50 to break contact at 55, 57. A power conductor 62 is connected to the contact. An electric counter 63 of standard type having an actuating magnet 64 is used in this connection. A power conductor 65 is conducted to one terminal of the magnet 64 and the other terminal of said magnet is connected by a conductor 66 to the contact 57. Thus each time the arm 50 swings outwardly and contact is made between contacts 55 and 57 the magnet 64 is energized and the counter 63 is actuated. Since, under normal conditions, each package will actuate the arm 50 as the package passes the nose 52 a true count will be obtained and, under abnormal conditions, the conveyor will cease to operate so there can be no false counting.

The function of the pivotal mounting of the bracket is to permit the bracket to swing when larger sized packages are passing along the conveyor. The bracket can, therefore, swing to accommodate these packages, and at the same time, the counter arm mounted on the bracket can move to count these larger sized packages.

In the modification shown in Figures 6 and 7, there is illustrated a form of the invention wherein the horizontal package separating roller or drum 24 is replaced by a separating drum or roller 67 mounted to rotate on a vertical axis and arranged for engagement with one side face of a package moving along the conveyor. This roll or drum 67 is supported and driven in the following manner. Fixed to and projecting laterally from one of the frame members 20 is a bracket indicated in general at 68. The bracket 68 includes a lower horizontal portion 69 at the outer end of which is an integral vertical portion 70. Projecting inwardly from the upper end of the portion 70 is an upper horizontal portion 71. The portions 69 and 71 carry vertically alined bearings 72 wherein is journalled a shaft 73. This shaft 73 projects downwardly through the lower bearing 72 and carries on its projecting end a bevel gear 74. Supported from the bracket 68 at the junction of the portions 69 and 70 is a bearing hanger 75 wherein is journalled the middle portion of a short shaft which carries on its inner end a bevel gear 76. On its outer end this short shaft carries a sprocket 77 which corresponds in function to the sprocket 28 and has the chain 29 trained therearound just as in the first form. A yoke 78 has bearings 79 at the ends of its arms and these bearings are revolubly mounted on the shaft 73 between the bearings 72. Fixed on the shaft 73 between the bearings 79 is a bevel gear 80 which meshes with a bevel gear 81 fixed on a shaft 81a journalled in a bearing 72 carried by the yoke 78. A U-shaped arm 83 is formed integrally with the bearing and extends inwardly at its free end with respect to the bearing 82. The free end of the arm 83 has a vertical bearing 84 formed thereon. Journalled in the bearing 84 is a shaft 85 on the upper end of which is fixed the drum 67. A bevel gear 86 is also fixed on the shaft 85 and meshes with a bevel gear 87 fixed on the same shaft 81a as the gear 81. The sprocket 77 and gear 76 rotate in unison. The gear 76 drives the gear 74 and thus the gear 80 which in turn drives the gear 81. The gear 81 drives the shaft 81a and thus the gear 87 which drives the gear 86 and drum 67. The proportions of the gearings are such that the drum 67 rotates at a higher peripheral speed than the drum 17 as before. Fixed on the frame member 20 which supports the bracket 68 is a stop pin 88 against which the arm 83 is normally held by a spring 89, this spring permitting yielding of the drum under certain abnormal conditions.

As a package P moves along the conveyor, one side face is engaged by the drum 67 which produces a speeding up of the package to separate it from the next succeeding package. As before, if the package engaged by the drum 67 be retarded from any cause the rotation of the drum will be checked with resultant checking of the rotation of the sprocket 77. This causes increase of tension on the lower run of the chain 29 and decrease of tension on the upper run of said chain to actuate the circuit breaking arm in the same manner as before.

If a package, due to greater width than normal or to improper placing on the conveyor, strikes the roller or drum 67 too heavily, the spring 89 will yield and the yoke 78 will swing about the axis of the shaft 73 so that the roller will swing into normal position relative to the package, the spring 89 returning the drum to normal position immediately upon the passage of such package.

Suitably mounted on the conveyor rail for rotation thereof is a rotatable roller 67a. The roller 67a functions to force the passing packages into engagement with the vertically mounted drum 67 in order to produce the speeding up of the package, as heretofore mentioned.

It will be obvious that the counter actuating arm 50 may be used to operate a mechanical counter as well as an electric counter.

It may, therefore, be seen that there is provided, in accordance with the present invention, a counting mechanism particularly for packaging conveyors comprising a delivery means, an extension conveyor having a package-engaging means, and means to drive the package-engaging means at a greater peripheral speed than the delivery means. Thus, the successive packages delivered from the delivery means will be spaced by the package-engaging means on the extension conveyor. There is also provided, in accordance with the invention, a counter actuating arm which is so located and arranged as to be movable into and out of the spaces between the packages formed by the action of the package-engaging means. There is also provided, in accordance with the invention, a means actuated by retardation of rotation of the package-engaging spacer to stop the delivery conveyor.

In the form illustrated, the stopping of the conveyor is effected by the action of an idler member suspended between the upper and lower runs of the chain drive for the package-engaging drum. This idler member acts when the package-engaging drum is retarded to open a switch, thus stopping the drive to the delivery means. However, it is obvious that the idler carried by the chain, in accordance with the invention, could be used to de-clutch a motor, rather than stop the drive. It is obvious also that in place of the chain disclosed, a cable could be used, and in place of the sprockets, a conventional type of pulley. The motor for driving the conveyor need not necessarily be an electric motor, as disclosed in the specific embodiment of the invention.

Although it is preferred, as illustrated in the specific embodiment of the invention, to drive the drum 24 at a faster rate than the drum 17 so that this drum will not only act to indicate improper counting but also a spacer to permit counting, the packages may be spaced by cams or other means known in the art, prior to passing over the drum 24. If the drum functions simply to indicate pushing together of the boxes, it is not necessary that it be driven at a faster rate of speed than drum 17.

What is claimed is:

1. A counting mechanism comprising a package conveyor having a delivery means, an extension conveyor receiving the packages from the first conveyor and having a package-engaging means, means to drive said second means at a greater surface speed than the first means whereby to separate successive packages delivered from the first means and form spaces between said packages, a counter actuating arm movable into and out of the spaces between the packages traversing the second conveyor, and means actuated by retardation of movement of said second means to stop the first mentioned delivery means whereby the operation of the counting arm is discontinued and miscounting of packages is prevented.

2. A counting mechanism comprising a package conveyor having a delivery drum, an extension conveyor receiving the packages from the first conveyor and having a package-engaging drum, means to rotate said second drum at a greater surface speed than the first drum whereby to separate successive packages delivered from the first drum and form spaces between said packages, a counter actuating arm movable into and out of the spaces between the packages traversing the second conveyor, and means actuated by retardation of rotation of said second drum to stop the first mentioned delivery drum whereby the operation of the counting arm is discontinued and miscounting of packages is prevented.

3. A counting mechanism comprising a package conveyor having a delivery means, an extension conveyor receiving the packages from the first conveyor and having a package-engaging means, means to drive said first mentioned means, means to drive said second mentioned means at a greater surface speed than the first means whereby to separate successive packages delivered from the first means and form spaces between said packages, a counter actuating arm movable into and out of the spaces between the packages traversing the second conveyor, and means actuated by retardation of movement of said second means to stop the driving means for the first means whereby the operation of the counting arm is discontinued and miscounting of the packages is prevented.

4. In a counting mechanism, a moving conveyor, a second conveying means driven at a faster rate than the first mentioned conveyor, and adapted to receive packages from the first mentioned conveyor and space the packages due to faster movement of said second conveying means, means to count said spaced packages traversing said second conveying means and means to stop the first mentioned conveyor when the movement of the second mentioned spacing conveyor is retarded whereby the operation of the counting means is discontinued and miscounting of packages is prevented.

5. A counting mechanism comprising a package conveyor having a delivery drum, an extension conveyor receiving the packages from the first conveyor and having a package-engaging drum, a sprocket mounted to rotate with said delivery drum, a second sprocket mounted to rotate with said package-engaging drum, a chain connecting the two sprockets and adapted to drive the second sprocket and drum at a greater surface speed than the first mentioned drum, whereby to separate successive packages delivered from the first drum and form spaces between said packages, a counter actuating arm movable into and out of the spaces between the packages traversing the second conveyor, and means actuated by retardation of movement of the second drum to stop the first mentioned delivery drum whereby the operation of the counting arm is discontinued and miscounting of packages is prevented.

6. A counting mechanism comprising a package conveyor having a delivery drum, an extension conveyor receiving the packages from the first conveyor and having a package-engaging drum, a sprocket mounted to rotate with said delivery drum, a second sprocket mounted to rotate with said package-engaging drum, a chain connecting the two sprockets and adapted to drive the second sprocket and drum at a greater surface speed than the first mentioned drum, whereby to separate successive packages delivered from the first drum and form spaces between said packages, a counter actuating arm movable into and out of the spaces between the packages traversing the second conveyor, and an idler member suspended between the upper and lower runs of the chain so as to pivot upon retardation of movement of the second drum and its corresponding sprocket and adapted to stop the first mentioned delivery drum whereby the operation of the counting arm is discontinued and miscounting of the packages is prevented.

7. A counting mechanism comprising a package conveyor having a delivery drum, an extension conveyor receiving the packages from the first conveyor and having a vertically mounted package-engaging drum, means including a gear train to drive said second drum at a greater surface speed than the first drum whereby to separate successive packages delivered from the first drum and form spaces between said packages, a counter actuating arm movable into and out of the spaces between the packages traversing the second conveyor, and means actuated by retardation of movement of said second drum to stop the first mentioned delivery drum whereby the operation of the counting arm is discontinued and miscounting of the packages is prevented.

8. A counting mechanism comprising a package conveyor having delivery means, an extension conveyor receiving the packages from the first conveyor and having a package-engaging means, means to drive said second means at a greater surface speed than the first means, whereby to separate successive packages delivered from the first means and form spaces between said packages, a counter arm pivoted adjacent the path of packages traversing said second conveyor and having a free package-engaging end adapted to enter the spaces between the packages, and means actuated by the retardation of the movement of said second means to stop the first mentioned delivery means whereby the operation of the counting arm is discontinued and miscounting of packages is prevented.

9. A counting mechanism comprising a package conveyor having an electric motor driven delivery drum, an extension conveyor receiving the packages from the first conveyor and having a package-engaging drum, means to drive said second drum at a greater peripheral speed than the first drum whereby to separate successive packages delivered from the first drum and form spaces between said packages, a counter actuating arm movable at one end into and out of the spaces between the packages traversing the second conveyor, means urging said arm end into said spaces, a normally closed circuit for said motor, and means actuated by retardation of the movement of said second drum to break the motor circuit and thereby stop actuation of the first drum whereby the operation of the counting arm is discontinued and miscounting of packages is prevented.

10. A counting mechanism comprising a main package conveyor having a frame and a delivery end provided with a delivery drum, electric motor means operatively connected to the delivery drum to drive the same at uniform speed, a normally closed circuit for said motor including a normally closed switch, an auxiliary gravity operated conveyor leading from the delivery end of the main conveyor so as to receive packages from the main conveyor and including a package-engaging drum having sprocket and chain connection with the first drum, said second drum having a greater surface speed than the first drum so as to separate said packages and form spaces therebetween, and a counter actuating arm pivoted adjacent the path of packages traversing the second conveyor and having a free package-engaging end, spring urged, to enter the spaces between the said packages, and means to open said normally closed circuit upon retardation of movement of said second drum whereby the operation of the counting arm is discontinued and miscounting of packages is prevented.

11. A counting mechanism comprising a main package conveyor having a frame and a delivery end provided with a delivery drum, electric motor means operatively connected to the delivery drum at uniform speed, a normally closed circuit for said motor including a normally closed switch, an auxiliary gravity operated conveyor leading from the delivery end of the main conveyor so as to receive packages from the main conveyor and including a package-engaging drum having sprocket and chain connection with the first drum, said second drum having a greater surface speed than the first drum so as to separate said packages and form spaces therebetween, a counter actuating arm pivoted adjacent the path of packages traversing the second conveyor and having a free package-engaging end, spring urged, to enter the spaces between the said packages, and means actuated by retardation of the movement of said second drum to open said switch and thereby break the motor circuit whereby the operation of the counting arm is discontinued and miscounting of packages is prevented.

12. A counting mechanism comprising a package conveyor having a delivery means, an extension conveyor receiving the packages from the first conveyor and having a package-engaging means, means to drive said packaging engaging means, means to space packages traversing the conveyor, a counter actuating arm movable into and out of the spaces between the packages traversing the second conveyor, and means actuated by retardation of movement of said package engaging means to stop the first mentioned delivery means whereby the operation of the counting arm is discontinued and miscounting of packages is prevented.

13. A counting mechanism comprising a package conveyor having a delivery means, an extension conveyor receiving the packages from the first conveyor and having a package engaging means, means to drive said second means at a greater surface speed than the first means whereby to separate successive packages delivered from the first means and form spaces between said packages, a counter actuating arm positioned adjacent the second means and movable into and out of the spaces between the packages traversing the second conveyor, and means actuated by retardation of movement of said second means to stop the first-mentioned delivery means, whereby the operation of the counting arm is discontinued and miscounting of packages is prevented.

WILLIAM BRUNNHOELZL.